United States Patent [19]

Bernat

[11] 4,292,997
[45] Oct. 6, 1981

[54] CARTRIDGE VALVE

[75] Inventor: Georg Bernat, Menden, Fed. Rep. of Germany

[73] Assignee: Friedrich Grohe Armaturenfabrik GmbH & Co., Hemer, Fed. Rep. of Germany

[21] Appl. No.: 47,713

[22] PCT Filed: Jul. 26, 1978

[86] PCT No.: PCT/DE78/00014

§ 371 Date: Apr. 30, 1979

§ 102(e) Date: Apr. 30, 1979

[87] PCT Pub. No.: WO79/00114

PCT Pub. Date: Mar. 8, 1979

[30] Foreign Application Priority Data

Aug. 31, 1977 [DE] Fed. Rep. of Germany ..... 27391547

[51] Int. Cl.³ ............................................. F16K 11/06
[52] U.S. Cl. ............................. 137/454.6; 137/625.17; 251/367; 251/368
[58] Field of Search ............. 137/454.2, 454.6, 625.17; 251/367, 368

[56] References Cited

U.S. PATENT DOCUMENTS

| 3,092,141 | 6/1963 | Stark | 251/367 X |
| 3,521,674 | 7/1970 | Oodson | 251/367 X |
| 3,736,959 | 6/1973 | Parkison | 137/454.6 X |
| 3,902,600 | 9/1975 | Turner | 251/368 X |
| 4,099,706 | 7/1978 | Stede | 251/367 |

FOREIGN PATENT DOCUMENTS 2253462 10/1972 Fed. Rep. of Germany ... 137/454.6

Primary Examiner—Harold W. Weakley
Attorney, Agent, or Firm—James B. Raden; Donald J. Lenkszus

[57] ABSTRACT

Valve, in particular for the sanitary engineering field, with two flat and smoothened plates, one on top of the other, held in a housing and movable towards each other as a valve element whereby the plates have one or more through-apertures for one or more media.

To simplify installation and reduce costs, the two plates are combined into one pack with appropriate sealing and sliding elements, the pack being bedded in a housing formed from two semi-monocoques having apertures for a valve actuating element and the inlet and outlet lines capable of insertion into an inlet and outlet flow device with pre-tensioning, whereby the contact surfaces of the two semi-monocoques are matched to the individual thickness of the pack by material deformation and are inseparably connected the one with the other.

6 Claims, 7 Drawing Figures

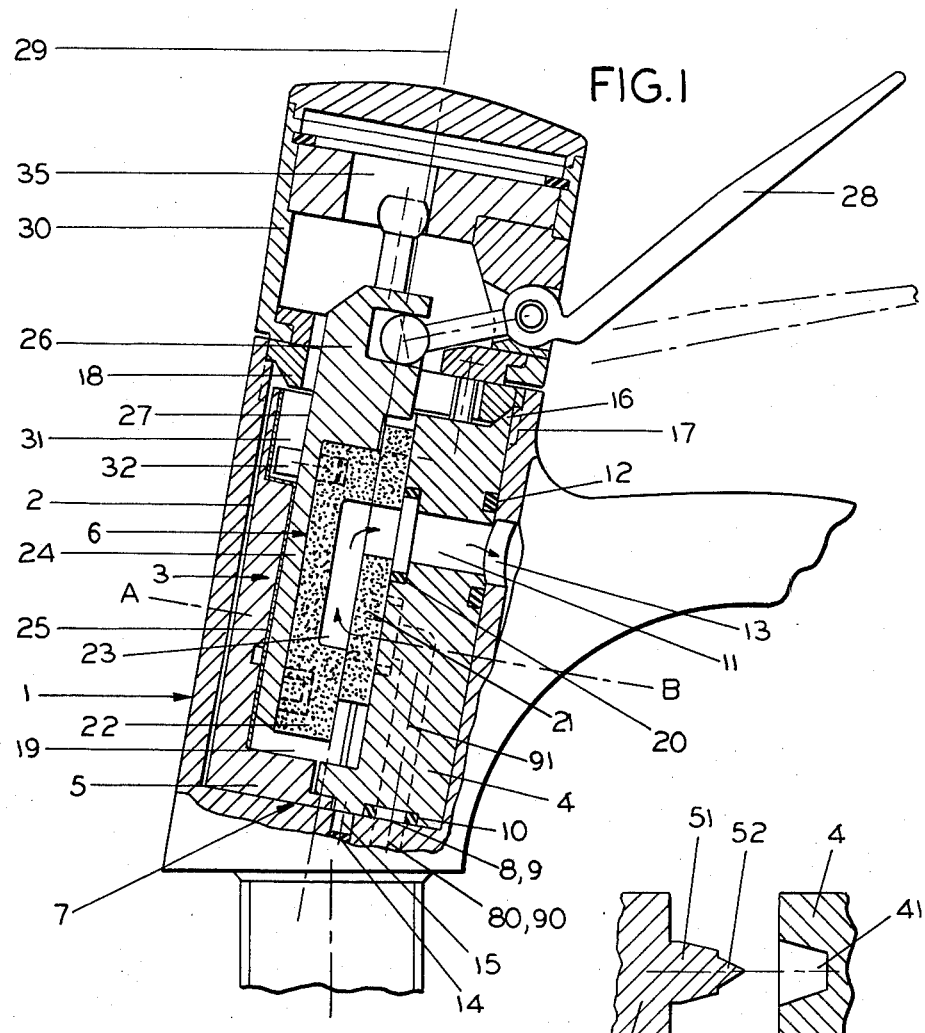
FIG.1
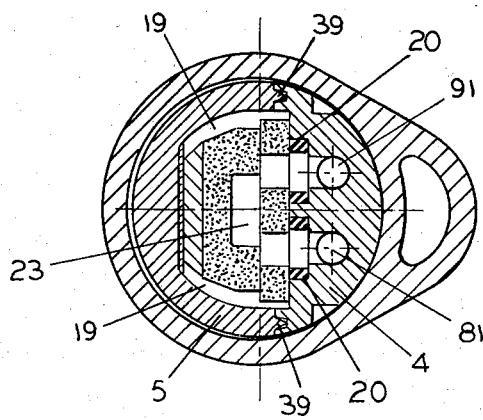
FIG.2
FIG.3

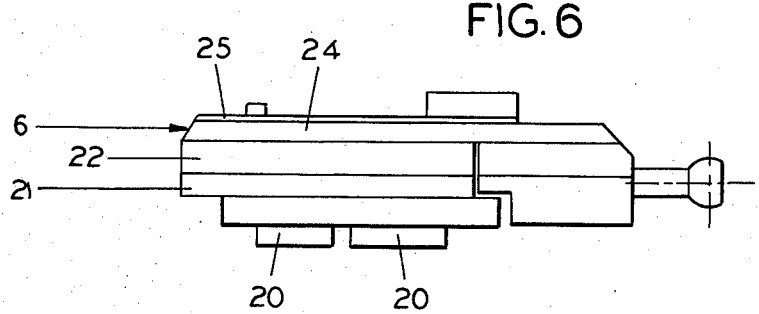
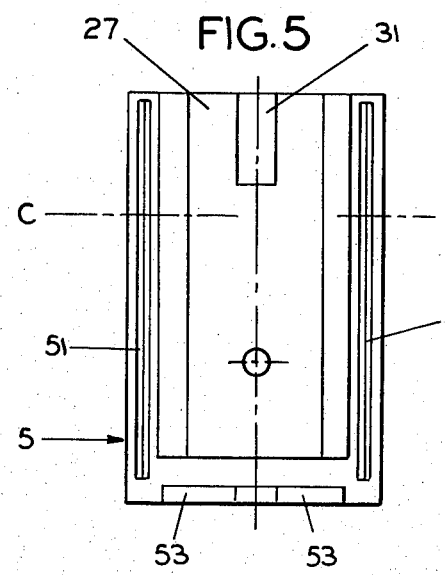
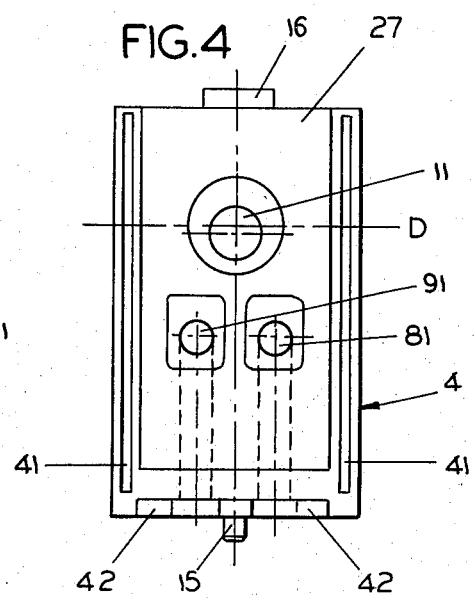
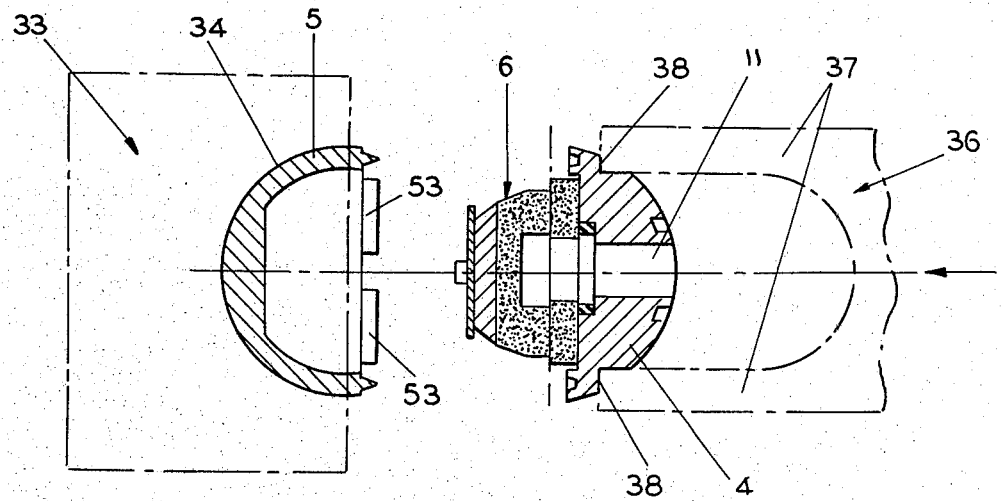

CARTRIDGE VALVE

The invention relates to a valve.

Valves of this type are known and are used mainly as volume and/or mixture regulating valves. Valves of this kind, particularly where the plates, movably mounted one to top of each other, are made of oxide ceramics, attain a very long service life. However, difficulties are shown with the arrangement of these valve plates in the valve because, in order to obtain reliable sealing, it is necessary to press the two plates together at a certain pre-tension. The disadvantage hereby is that, for each element, particularly in cost-favourable production, the prescribed dimensions can only be maintained within certain tolerances.

Consequently, the invention is based upon the requirement to create a valve in which the plates, irrespective of their deviations in dimension, can be cost-favourably inserted in the required manner and also to form the valve in such a way that it can be secured, sealed, in a fitting or other device at the inlet and outlet apertures in simple manner as well as to describe a process for the manufacture of this valve.

By means of this embodiment, it is brought about in amazingly simple manner that the valve can be made up of a few simply produced parts. The pack consisting of the valve plates with their sealing and sliding elements can be manufactured in the most favourable economic manner with relatively high production tolerances which is of particular advantage particularly when using valve plates of extremely hard and abrasion-resistant oxide ceramics.

The assembly of the valve can be carried out in a few movements of the hand by semi-skilled personnel with few qualifications. The fitting in and welding processes take place in fractions of a minute.

It is also possible to withdraw the pack through an end aperture, check it, service it, or clean it and then return it into the housing once the two semimonocoques have been inseparably joined in a preferred form.

An example of an embodiment of the invention is illustrated using a single-handle mixer valve.

FIG. 1 shows a partially cut-away side view of the mixer valve;

FIG. 2 shows a section along the line A-B of FIG. 1;

FIG. 3 shows an enlarged view of part of the tonguing of the two semimonocoques forming the housing;

FIG. 4 shows a semimonocoque with the inlet and outlet apertures;

FIG. 5 shows the second semimonocoque;

FIG. 6 shows a valve plate pack; and

FIG. 7 shows the valve before final joining in the die, the semimonocoques being cut on the plane C-D of FIGS. 4 and 5.

A valve 3 to control the mixture ratio and outflow volume is arranged in a blind bore 2 in the body of a fitting 1. The valve is formed in the main of two semimonocoques 4 and 5 and a pack 6 of valve plates, which can be moved in part towards each other, bedded in the semimonocoques with pre-tension.

The housing 7 made up of the two semimonocoques 4 and 5 is approximately cylindrical in form. Inlet apertures 8 and 9 for hot and cold water are provided in the one semimonocoque 4 on the bottom end face and provide the connection between the inlet 80 and 90 of the fitting and the water guides 81 and 91 in the valve 3 by means of sealing rings 10. The mixed water passes out through a radial aperture 11 on the generated surface of semimonocoque 4, sealed by a sealing ring 12, into an outlet 13 in the fitting 1. To provide secure and leak-proof holding of the valve 3, a fitting bore 14 is provided on one side in the base of the blind bore 2 in which rests a formed-on pin 15 on the end face of the semimonocoque 4 and, on the other side, a nose 16 with inner tapered surface, projecting at the edge, is formed on the opposite end face on which rests a nut 18 with a correspondingly tapered surface, which is screwed into a thread 17 in the blind bore 2.

The pack 6 is bedded in a hollow 19 in the housing 7 with pre-tension and consists of a plate 21 of smoothed oxide ceramics featuring inlet and outlet apertures, sealed by sealing elements at the semimonocoque 4 and immovably fixed, on which rests a second plate 22, also of oxide ceramics, with a transfer flow passage 23. The plate 22, in contrast to the plate 21, is movably held by a sliding element 24 which slides on a sliding plate 25 fixed in the semimonocoque 5.

A valve control element 26 is formed of one piece with the sliding element 25 and is passed through an opening 27 in the end face of the housing 7 and contains accommodation for an actuating lever 28. The actuating lever 28 is carried in a fitting head piece 30 which can rotate around its mean axis and can be moved up and down. Through the up and down movement, the valve control element 26 is moved parallel to the mean axis 29 together with the moving plate 22 so that the outflowing water volume is regulated. In addition, the valve control element is guided by a guide pin in a radial groove 35 in the fitting head piece 30 and is carried in a slot aperture 31 at right angles to the mean axis 29 by a pin forming a pivot point 32 so that the valve control element 26 is subjected to movement through the radial groove 25 when the actuating lever 28 is moved and the head piece of the fitting 30 is rotated. By this means, the movable valve plate 22 is slewed around the pivot point 32 to the fixed plate 21 so that the through-flow cross-section of the one inlet aperture is reduced and that of the second aperture is enlarged, i.e. the mixture ratio or the temperature of the mixed water emerging is changed but the outflow volume remains approximately unchanged.

The housing 7 consisting of two semimonocoques 4 and 5 accommodating the pack 6 is joined together by tonguing as can be seen in particular in FIG. 3. The semimonocoque 4 is provided with two grooves 41 running parallel to the generated surface and being slightly trapezoidal in shape in the area of the contact surfaces 39. A tongue 51 is formed on the second semimonocoque 5 to match the grooves whereby a tip 52 approximating in cross-section 2 an equilateral triangle is also formed on the tongues.

The valve is assembled by firstly inserting the pack 6 loose into the hollow 19 and then pushing the two semimonocoques 4 and 5 together by means of their tonguing. To enable the two semimonocoques to be fixed in the correct position axially in relation to the other, a gauge 53 is formed on the bottom end face of the semimonocoque 5 which fits into a transverse slot 42 on the semimonocoque 4. The loosely joined valve 3 is now placed in a bottom die 33, the semimonocoque 5 resting with its cylindrical surface in a semi-circular mould 34. The contact surface 39 of the two semimonocoques located in the tonguing area is so formed that it protrudes approximately 5 to 10% of the diameter parallel to the die plane. Hereafter, the top die 36 is lowered onto the semimonocoque 4 with its yoke-shaped part 37 and comes to rest in trough-shaped cut-outs 38 formed parallel to the contact surfaces 39. Ultrasonic vibration of approx. 20-40 kHz is then produced by an ultrasonic generator coupled to the top die 36 combined with joining pressure whereby the material at the contact surfaces 39, particularly in the region of the tip 52 of the tongue 51, heats up and fuses. This process is continued until the hollow 19 in the housing 7 is reduced in thickness until the pack 6 is bedded in the housing at the required pre-tension. The vibration is then switched off and is directly followed by inseparable welding in this position.

The dimensions of the semimonocoque 5 are so designed by preference that an exactly cylindrical form of the housing 7 is obtained within the maximum manufacturing tolerances, i.e. as a rule, the semimonocoque 5 is somewhat smaller after the welding process as can be seen in particular in FIGS. 1 and 2. This ensures that the valve can be easily pushed into the blind bore 2 and secured. Sealing of the inlet and outlet is provided on the semimonocoque 4 by the special means described above. Moreover, the play between the wall of the blind bore 2 and the cylindrical surface of the semimonocoque 5 ensures simple and easy assembly and disassembly of the valve 3 in the fitting after a long period of use.

I claim:

1. A valve assembly comprising:
a valve body having a central bore having a mean longitudinal axis, and having a plurality of inlet apertures and an outlet aperture;
a valve cartridge adapted to be inserted into said central bore, said valve cartridge comprising first and second semicylindrical members, said second member, having a plurality of first apertures, each of said first apertures in communication with a corresponding one of said plurality of inlet apertures and a first outlet aperture in communication with said outlet aperture, said first and second members each having corresponding mating surfaces which are bonded together, said first and second members jointly forming a chamber about said mean axis; and
first and second valve plates disposed within said chamber parallel to said mean axis, said first valve plate having a first plurality of in flow apertures each in communication with one of said first apertures and an outflow aperture in communication with said first outlet aperture, said second valve plate having a mixing passage adapted for communicating between said first plurality of inflow apertures and said outflow aperture, said second plate being movable relative to said first plate to control the flow and mixture of fluids; and means for moving said second plate parallel to said axis, said first and second members being arranged such that the interior surfaces of said first and second members pretension said first and second valve plates.

2. A valve assembly in accordance with claim 1 wherein said cartridge comprises plastic material and said first and second members are welded together.

3. A valve assembly in accordance with claims 1 or 2 wherein said first and second members are welded by ultrasonics.

4. A valve assembly in accordance with claim 3 wherein said first and second members are tongued together in the area of their contact surfaces whereby one of said first and second members includes tongues and the other of said members includes grooves adapted to receive said tongues, said grooves being slightly trapezoidal in cross-section and said tongues include tips approximating in cross-section an equilateral triangle parallel to mean axis.

5. A valve assembly in accordance with claim 4, wherein said moving means includes a valve control element and said cartridge includes an aperture on one end face of said cartridge to conduct said valve control element.

6. A valve assembly in accordance with claim 5 wherein said central bore is a blind bore, said cartridge includes at one end a pin which is supported on the base of said blind bore and a nose protruding at an edge at the other end of said cartridge, said nose having a tapered inner surface; and said assembly further including a nut, which can be screwed into a thread in said blind bore which rests on said tapered inner surface, said nut having a corresponding tapered outer surface.

* * * * *